(12) United States Patent
Moon

(10) Patent No.: US 6,924,794 B2
(45) Date of Patent: Aug. 2, 2005

(54) LIQUID CRYSTAL DISPLAY

(75) Inventor: Sung Woong Moon, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 336 days.

(21) Appl. No.: 10/175,886

(22) Filed: Jun. 21, 2002

(65) Prior Publication Data
US 2003/0067428 A1 Apr. 10, 2003

(30) Foreign Application Priority Data
Oct. 10, 2001 (KR) ...................................... P2001-62426

(51) Int. Cl.$^7$ ................................................ G09G 5/00
(52) U.S. Cl. ........................ 345/204; 345/205; 345/206; 349/150
(58) Field of Search .......................... 345/87, 204–206, 345/98, 93, 95, 103; 349/150, 40, 141, 153, 54, 192

(56) References Cited

U.S. PATENT DOCUMENTS 5,737,272 A * 4/1998 Uchiyama et al. .......... 345/206
5,969,544 A * 10/1999 Iwao et al. .................... 326/93
6,333,769 B1 * 12/2001 Suzuki et al. ................. 349/40
6,388,719 B1 * 5/2002 Matsunaga et al. ........... 349/40
6,429,908 B1 * 8/2002 Lim ............................. 349/54
2003/0117559 A1 * 6/2003 Kim et al. ................... 349/141

* cited by examiner

Primary Examiner—Amare Mengistu
(74) Attorney, Agent, or Firm—McKenna, Long & Aldridge LLP

(57) ABSTRACT

A liquid crystal display device simplifies an input portion of an integrated circuit and employs a liquid crystal panel having signal lines for displaying a data and liquid crystal cells arranged on a display-area thereof, and integrated circuits connected to the signal lines. The integrated circuits use an input signal and generate a driving signal demanded in the integrated circuits. On a non-display area corresponding to a edge of the liquid crystal panel, a common line is formed for receiving the input signal. The common line is connected to the integrated circuit through an input line. The input line applies the input signal from the common line to the integrated circuits. The input line is connected to the common line by a contact formed in a through-hole.

20 Claims, 3 Drawing Sheets

LIQUID CRYSTAL DISPLAY

This application claims the benefit of Korean Patent Application No. P2001-62426, filed on Oct. 10, 2001, which is hereby incorporated by reference for all purposes as if fully set forth herein.

BACKGROUND OF THE INVENTION

1. Field of the Invention

The present invention relates to a liquid crystal display, and more particularly to an apparatus for simplifying an input unit of integrated circuit.

2. Discussion of the Related Art

Conventionally, liquid crystal displays (LCDs) display pictures using an electric field to control light transmissivity characteristics of a liquid crystal material found within the display. Liquid crystal displays include a liquid crystal panel with liquid crystal cells arranged in an active matrix pattern and a driving circuit for driving the liquid crystal panel.

Gate lines and data lines are arranged on the liquid crystal panel in such a manner as to cross with each other. The liquid crystal cells are positioned at crossings of the gate lines and the data lines. The liquid crystal panel further includes a common electrode and a plurality of pixel electrodes for applying the electric field to each of the liquid crystal cells. Each of the pixel electrodes is connected to any one of the data lines through source and drain terminals of a thin film transistor that acts as a switching device. A gate terminal of the thin film transistor is connected to any one of the gate lines, thereby allowing a pixel voltage signal to be applied to pixel electrodes in each line.

The driving circuit includes a gate driver for driving the gate lines, a data driver for driving the data lines, a controller for controlling the gate and data drivers, and a power supply for providing several driving voltages used by the liquid crystal display device. The controller controls the timings of the gate and data drivers and further provides the data driver with a pixel data signal. The power supply uses an input voltage (i.e., an external voltage) and produces the plurality of driving voltages, e.g., common voltage(VCOM), high level gate voltage(VGH), low level gate voltage(VGL), etc., used by the liquid crystal display. The gate driver sequentially supplies the gate lines with scanning signals to drive the liquid crystal cells on the gate lines are driven one line at a time. When the scanning signal is applied to any one of the gate lines, a pixel voltage signal, supplied by the data driver, is applied to each of the data lines. Accordingly, the pixel voltage signal creates an electric field between the pixel and common electrodes, wherein the pixel and common electrodes in each liquid crystal cell thereby adjust the light transmissivity characteristics of the liquid crystal material to display a picture.

Typically, the gate and data drivers are integrated within an Integrated Circuit(hereinafter referred to as IC) chip and are connected directly to the liquid crystal panel. In connecting the gate and data drivers to the liquid crystal panel, data and gate driver IC chips are mounted onto a Tape Carrier Package (hereinafter referred to as TCP) in a Tape Automated Bonding(hereinafter referred to as TAB) process or are directly mounted onto the liquid crystal panel in a Chip On Glass (hereinafter referred to as COG) process.

FIG. 1 illustrates a schematic view of driver IC chips connected to the liquid crystal panel using a TAB process.

Generally referring to FIG. 1, the driving IC chips are connected to the liquid crystal panel via the TCP using a TAB process. Driver IC chips receive controlling signals and the direct current voltages from signal lines on a Printed Circuit Board (PCB) connected with the TCP.

More specifically, data driver IC chips 8 are connected in series to signal lines on a data PCB 6 and commonly receive controlling signals and the pixel data signal from the controller and the driving voltage from the power supply. A data TCP 10, on which the data driver IC chips 8 are mounted, connects the liquid crystal panel 2 and the data PCB 6. The data PCB 6 is electrically connected to a gate PCB 4 by the FPC 16.

Gate driver IC chips 12 are connected in series to signal lines on the gate PCB 4 and commonly receive controlling signals from the controller and the driving voltages from the power supply. A gate TCP 14, on which the gate driver IC chips 12 are mounted, is connected the gate PCB 4 and the liquid crystal panel 2.

FIG. 2 illustrates a schematic view of driver IC chips mounted onto the liquid crystal panel using the COG process.

Referring to FIG. 2, in the COG process, gate driver IC chips 12 are mounted onto pad areas of the liquid crystal panel 2 and data driver IC chips 8 are mounted on a data TCP 10 and electrically connected to the liquid crystal panel 2.

Data driver IC chips 8, mounted on the data TCP 10, are electrically connected to the data lines on the liquid crystal panel 2 and the data PCB 6. A controller 20 formed in the data PCB 6 inputs external video data and synchronized signals and generates the controlling signals and video data required by the data and gate driver IC chips 8 and 12, respectively.

The gate driver IC chips 12 are arranged on the pad area of the liquid crystal panel 2. The controlling signals and the driving voltages required by the gate driver IC 12 are generated in the controller 20 and power supply, respectively, and are supplied to the gate driver IC chips 12 via the data TCP 10 and the common lines (VL).

Gate driving signals applied to the gate driver IC chips 12 are routed through the data PCB 6, the data TCP 10 and the gate PCB 4. Accordingly, the COG process connects the gate PCB 4 to the liquid crystal panel using an Anisotropic Conductive Film (ACF) bonding process. A disadvantage inherent in ACF bonding processes lies in the fact that alien materials acting as pollutants may be present at the bonding interface.

In order to overcome the aforementioned disadvantage, liquid crystal displays employing COG processes may directly apply gate driving signals to the gate driver IC chips 12 mounted on the liquid crystal panel 2 via the data TCP 10, as shown in FIG. 3.

Referring to FIG. 3, gate driving signals required by the gate driver IC chips 12 are generated in the controller and the power supply and are applied to the gate driver IC chips 12 via the data TCP 10 and the common lines (VL). Accordingly, gate driving signals are directly transferred from the data TCP 10 to the gate driver IC 12 without passing through the gate PCB. Accordingly, the introduction of alien material at the bonding interface is eliminated because the ACF bonding process is eliminated.

However, LCD devices fabricated using COG methods have an additional problem wherein the gate driving signal, applied from one gate driver IC to the next gate driver IC, is doubly inputted and outputted in the same gate driver IC 12.

SUMMARY OF THE INVENTION

Accordingly, the present invention is directed to a liquid crystal panel that substantially obviates one or more of the problems due to limitations and disadvantages of the related art.

An advantage of the present invention is to provide a liquid crystal display device adaptable to simplify an input portion of the integrated circuit.

Additional features and advantages of the invention will be set forth in the description that follows, and in part will be apparent from the description, or may be learned by practice of the invention. Other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a liquid crystal panel having signal lines used for a data display and liquid crystal cells formed on a display area therein; a plurality of integrated circuits connected to the signal lines for receiving an input signal and for applying a driving signal to the signal lines; a common line formed on a non-display area of the liquid crystal panel for receiving the input signal; and an input line connected between the common line and the integrated circuits for applying the input signal to the integrated circuits.

The input line may be formed in a first conductive layer of a lower substrate included in the liquid crystal panel.

The common line may be formed in a second conductive layer of the lower substrate different from the first conductive layer.

The input line and the common line may be arranged to cross each other.

A through-hole may be formed to pass through the first and second conductive layers into which the input line and the common line may be electrically connected to each other by a contact formed from a conductive material, e.g., any one of copper, gold, silver, chromium, and combinations thereof.

The signal lines may include gate lines and data lines arranged to cross with the gate lines.

The integrated circuit may include a gate driving integrated circuit positioned on the non-display area of the liquid crystal panel.

The liquid crystal display device may further include a data driving integrated circuit for driving the data line, a tape carrier package for supporting the data driving integrated circuit, and a printed circuit board connected to the tape carrier package.

The liquid crystal display device further includes a controller for generating a controlling signal and a power supply for generating a voltage signal, wherein both signals are required by the integrated circuits.

The common line receives a gate driving signal. The gate driving signal includes a gate controlling signal and a gate power signal. The gate controlling signal includes a gate start pulse, a gate shift clock signal and a gate enable signal. The gate power signal includes a high level gate voltage signal, a low level gate voltage signal, a common voltage signal, a ground voltage signal, and a power voltage signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included herewith to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 1:
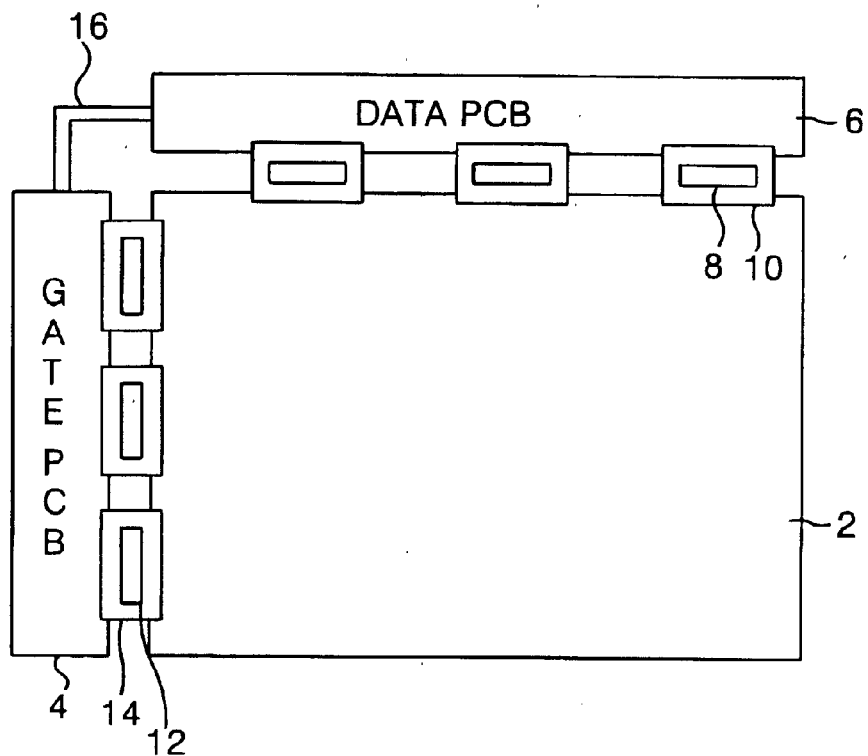
FIG. 1 illustrates a plane view of a related art liquid crystal display device formed using a Tape Automated Bonding (TAB) process.
Figure 2:
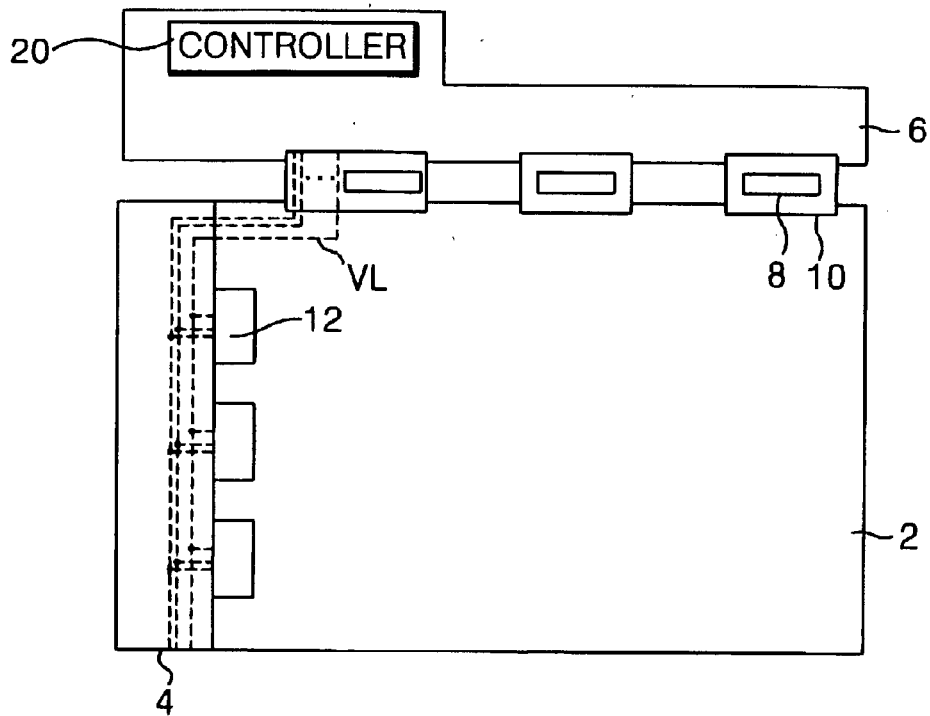
FIG. 2 illustrates a plane view of a related art liquid crystal display device formed using a Chip On Glass (COG) process.
Figure 3:
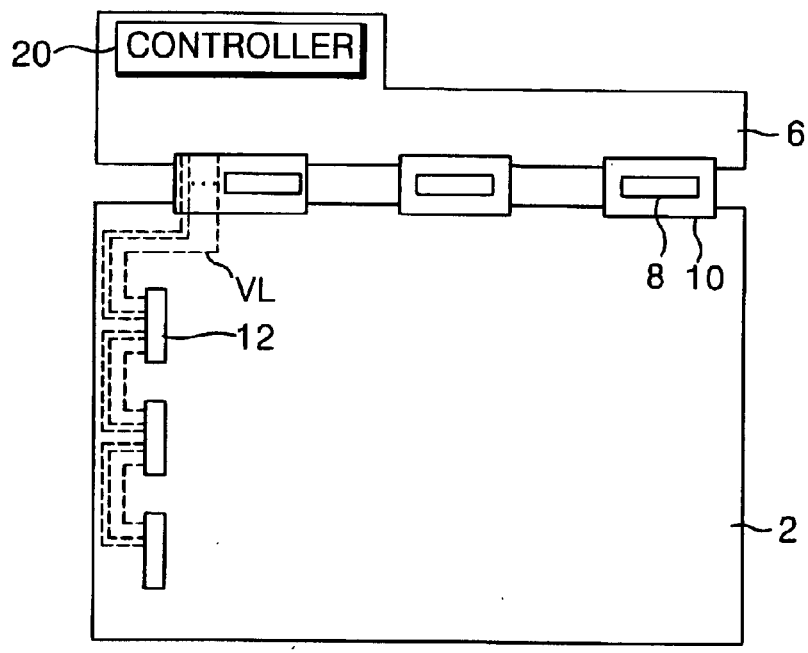
FIG. 3 illustrates a plane view of another liquid crystal display device formed using a COG process different from that illustrated in FIG. 2.
Figure 4:
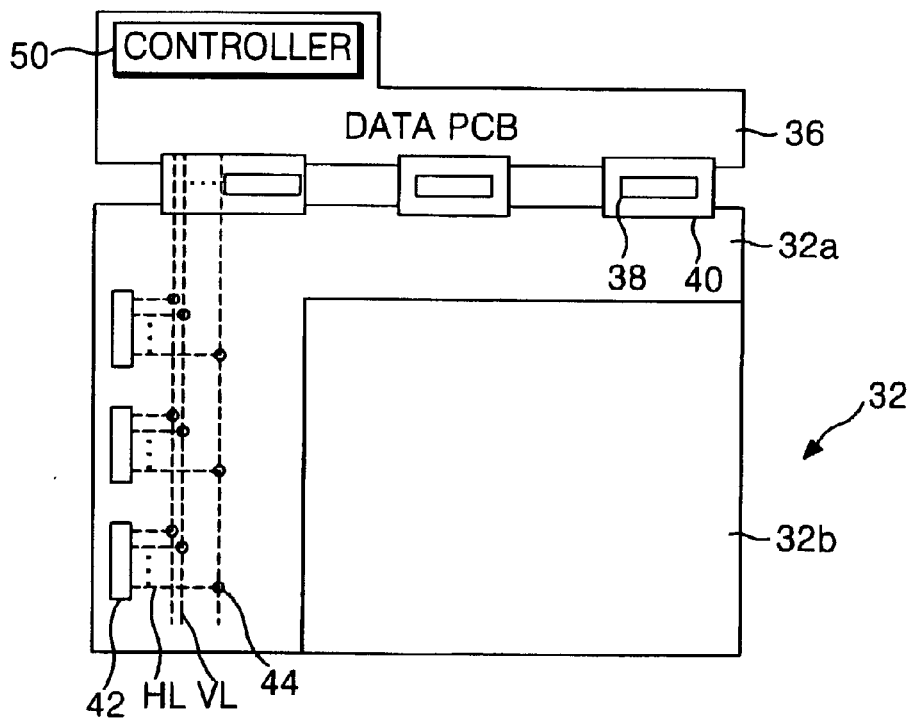
FIG. 4 illustrates a plan view of a liquid crystal display according to an embodiment of the present invention formed using a COG process.
Figure 5:
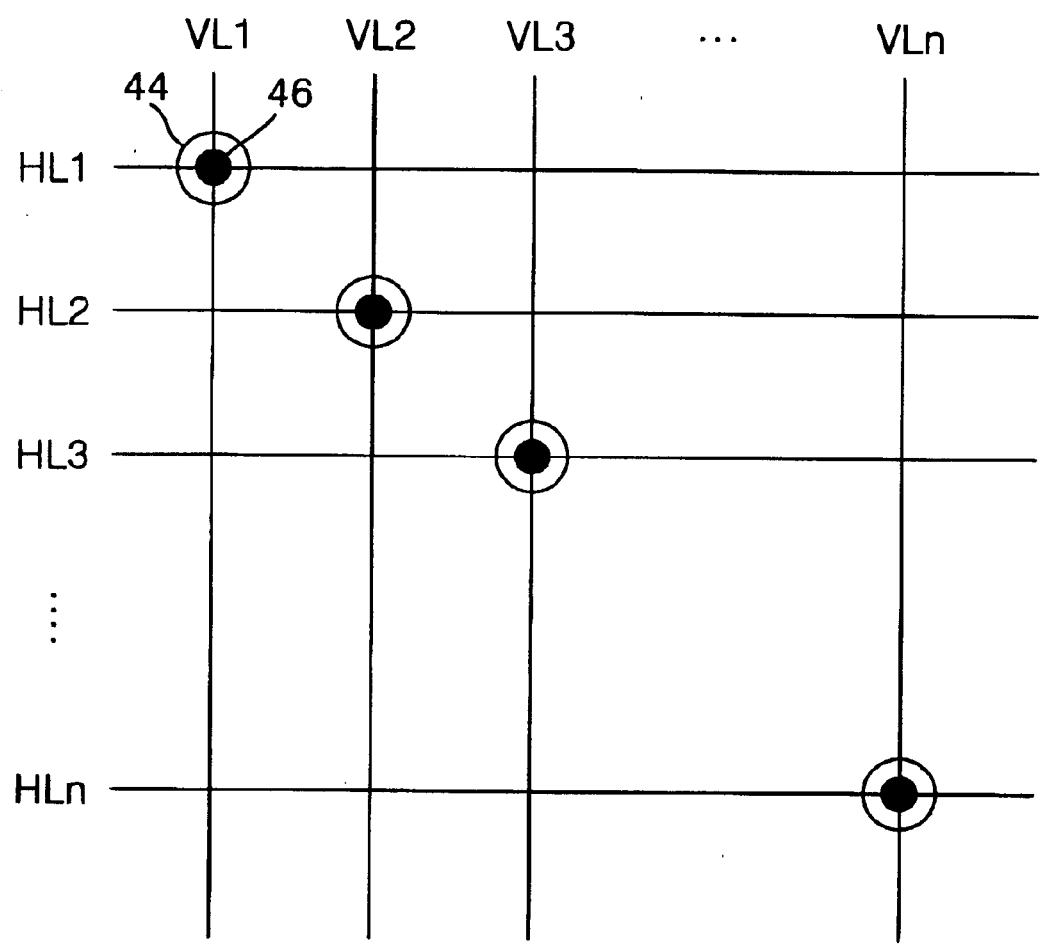
FIG. 5 illustrates a detailed plan view of the through-hole shown in FIG. 4.

FIGS. 4 and 5 illustrate a liquid crystal display device according to an embodiment of the present invention.

Referring to FIG. 4, a liquid crystal display according to an embodiment of the present invention is formed using a Chip On Glass (COG) process.

The liquid crystal display device formed by a COG process includes data driver Integratede Circuit (IC) chips 38 for applying data signals to data lines (not shown) on a liquid cytstal panel 32, gate driver IC chips 42 arranged on a non-display area of the liquid crystal panel 32, and a controller 50 for generating controlling signals applied to the gate and data drive IC chips 42 and 38, respectively.

The controller 50 supplies the data driver IC chips 38 with red, green, and blue digital video data inputted from an external device (not shown). Further, the controller 50 generates a data controlling signal (e.g., a dot clock (Dclk) signal, a source shifting clock (SSC) signal, a source enabling (SOE) signal, and a polarity inversion (POL) signal, etc.) and a gate controlling signal (e.g., a gate start pulse (GSP) signal, a gate shifting clock (GSC) signal, and a gate output enabling (GOE) signal, etc.) using horizontal and vertical synchronizing signals also inputted from the external device. In one aspect of the present invention, the gate controlling signal may be applied to the gate driver IC chips 42 via a data PCB 36 and a plurality of common lines (VL).

The data driver IC chips 38 may be loaded on data TCPs 40 and, in turn, electrically connected to the data lines on the liquid crystal panel 32 and the data PCB 36. Each of the data driver IC chips 38 receive the red, green, and blue digital video data together with the data controlling signal, from the controller 32. Red, green, and blue digital video data for one line may be latched to data driver IC chips 38 in synchrony with the data controlling signal and may be compensated in accordance with a gamma voltage. The data driver IC chips 38 convert the gamma-compensated digital data into analog data signals subsequently apply the converted data signals to the data lines for each gate line scanned by the gate driver IC chips.

Arranged on the non-display area of the liquid crystal panel 32, each of the gate driver IC chips 42 include a shift register for responding to the gate start pulse GSP from the controller 50 and for generating a scanning pulse, and a level shifter for shifting a voltage of the scanning pulse to a voltage suitable to the driving of a liquid crystal cell. Further, each of the gate driver IC chips 42 receive direct-current voltages from an external power supply (not shown). In response to the gate controlling signal from the controller 50, the gate driver IC chips 42 allow the scanning pulse to be sequentially applied to each of the gate lines within the liquid crystal panel 32. Responsive to the scanning pulse, data signals on the data lines are applied to the liquid crystal cell via a thin film transistor (not shown).

The liquid crystal panel 32 includes two opposing glass substrates 32a and 32b with liquid crystal material injected therebetween. The gate and data lines are formed to cross each other on the lower glass substrate 32a.

The thin film transistor is formed at each crossing of the gate and data lines and selectively transfers the data signal from the data line to the liquid crystal cell. The thin film transistor includes a gate terminal connected to the gate line, a source terminal connected to the data line, and a drain terminal connected to a pixel electrode within the liquid crystal cell.

Referring still to FIG. 4, a plurality of through-holes 44 may be formed in the nondisplay area of the liquid crystal panel 32. Input lines (HL) of the gate driver IC chips 42 may be connected, via the through-holes 44, to the common lines (VL) extending from the data TCP 40.

More specifically, the input lines (HL) of the gate driver IC chips 42 are formed in a first conductive layer (not shown) of the lower substrate 32a while the common lines (VL) are formed in a second conductive layer (not shown), wherein the second conductive layer is different from the first conductive layer. The input lines (HL) in the first conductive layer and the common lines (VL) in the second conductive layer cross each other. The input lines (HL) and the common lines (VL) each formed on the different layers may be selectively connected to each other via contacts 46 formed in through-holes 44 passing through the first and second conductive layers. In one aspect of the present invention, the contacts 46 may be made of a conductive material such as copper (Cu), gold (Au), silver (Ag), chromium (Cr), etc., and combinations thereof, formed in a process of selectively coating the through-holes 44, as shown in FIG. 5.

Referring to FIG. 5, a first input line (HL1) is connected to a first common line (VL1) by forming the through-hole 44 and subsequently coating the through-hole 44. Coating the through-hole 44 allows the first input line (HL1) to be connected to the first common line (VL1). Accordingly, the first input line (HL1) may receive the gate driving signals from the controller 50 and the power supply via the first common line (VL1) such that the first input line (HL1) may apply gate driving signals to the gate driver IC chip 42. Similarly, a second input line (HL2) may be connected to a second common line (VL2) via a contact 46 formed in through-hole 44, wherein the contact 46 is formed by similarly coating the through-hole 44. Accordingly, coating the through-hole 44 in the above described manner allows the second input line (HL2) to be connected to the second common line (VL2) such that gate driving signals applied from the controller 50 and the power supply via the second common line (VL2) so that the gate driving signals may be applied to the gate driver IC chip 42.

Similar to the first and second input lines (HL1) and (HL2), the third to (n)th input lines (HL3) to (HLn) may be selectively connected to the third to (n)th common lines (VL3) to (VLn), respectively, via the through-holes 44 and receive the gate driving signals. In one aspect of the present invention, the gate driving signals may include voltage signals such as a gate high voltage (VGH) signal, a gate low voltage (VGL) signal, a common voltage (VCOM) signal, a ground voltage (GND) signal, and a supply voltage (VCC) signal from the power supply. In another aspect of the present invention, controlling signals may include a gate start pulse (GSP), a gate shift clock (GSC) signal, and a gate enable (GOE) signal from the controller 50.

As described above, the liquid crystal display device according to the present invention allows the formation of through-holes in a non-display area of a liquid crystal panel. Accordingly, input lines of the gate driver IC chips may be connected to common lines for applying the gate driving signals, via the through-holes. Input portions of the gate driver IC chips may therefore be simplified and gate driving signals from the controller of the data PCB and the power supply may be applied directly to the gate driver IC chips without passing through any gate PCB.

Accordingly, the liquid crystal display device according to the present invention enables the gate driver IC chips to be mounted on the liquid crystal panel, thereby eliminating the introduction of alien materials at a bonding interface.

It will be apparent to those skilled in the art that various modifications and variations can be made in the method of manufacturing a flat panel display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a liquid crystal panel having a plurality of signal lines, a display area, and a non-display area, wherein a plurality of liquid crystal cells are formed within the display area and wherein the plurality of signal lines are capable of displaying data;
   a plurality of integrated circuit chips connected to the plurality of signal lines, the plurality of integrated circuit chips for receiving an input signal and for applying a driving signal to the signal lines;
   a plurality of common lines formed on the non-display area for receiving the input signal; and
   a plurality of input lines for connecting the common lines and the integrated circuit chips and applying the input signal to the integrated circuits, wherein the common lines are formed in a different conductive layer than the input lines.

2. The liquid crystal display device according to claim 1, wherein the plurality of input lines and the plurality of common lines are arranged so as to cross each other.

3. The liquid crystal display device according to claim 1, further comprising:
   a lower substrate including a first conductive layer, wherein the liquid crystal panel includes the lower substrate; and
   a plurality of input lines formed in the first conductive layer.

4. The liquid crystal display device according to claim 3, wherein the a lower substrate further comprises a second conductive layer, different from the first conductive layer, wherein the plurality of common lines are formed in the second conductive layer.

5. The liquid crystal display according to claim 4, further comprising a through-hole through the first and second conductive layers.

6. The liquid crystal display according to claim 5, wherein the plurality of input lines and the plurality of common lines are electrically connected to each other by a contact formed in the though-hole.

7. The liquid crystal display device according to claim 6, wherein the contact is from a conductive material.

8. The liquid crystal display device according to claim 7, wherein the conductive material is any one of copper, gold, silver, and chrome.

9. The liquid crystal display according to claim 1, wherein the signal lines include:

a plurality of gate lines; and a plurality of data lines arranged so as to cross the plurality of gate lines.

10. The liquid crystal display device according to claim 9, further comprising:

a plurality of tape carrier packages;

a plurality of data driver integrated circuit chips mounted on the plurality of tape carrier packages, for driving the plurality of data lines; and a printed circuit board connected to the tape carrier package.

11. The liquid crystal display device according to claim 1, wherein the integrated circuit chips include a plurality of gate driver integrated circuit chips.

12. The liquid crystal display device according to claim 11, wherein the plurality of gate driver integrated circuit chips are disposed on the non-display area of the liquid crystal panel.

13. The liquid crystal display device according to claim 1, further comprising:

a controller for generating a controlling signal required by the plurality of integrated circuit chips; and a power supply for generating a voltage signal required by the plurality of integrated circuit chips.

14. The liquid crystal display device according to claim 1, wherein the plurality of common lines receive a gate driving signal.

15. The liquid crystal display device according to claim 14, wherein the gate driving signal includes:

a gate controlling signal; and a gate power signal.

16. The liquid crystal display device according to claim 15, wherein the gate controlling signal includes at least one of a gate start pulse, a gate shift clock signal, and a gate enabled signal; and the gate power signal includes at least one of a high level gate voltage signal, a low level gate voltage signal, a common voltage signal, a ground voltage signal, and a power voltage signal.

17. A liquid crystal display device, comprising:

a liquid crystal panel;

a controller for generating controlling signals;

a plurality of input lines formed in a first conductive layer a plurality of common lines connected to the controller, the plurality of common lines provided in a second conductive layer, the second conductive layer being different than the first conductive layer, the plurality of input lines coupled to the plurality of common lines at a crossing of the plurality of input lines and common lines; and a plurality of gate driver IC chips coupled to the plurality of input lines.

18. The liquid crystal display according to claim 17, wherein the liquid crystal panel includes a non-display area, wherein the crossing of the plurality of input lines and common lines occurs within the non-display area.

19. The liquid crystal display according to claim 17, further comprising a contact formed at the crossing of the plurality of input lines and common lines, connected to the plurality of input lines and common lines.

20. The liquid crystal display according to claim 17, wherein the liquid crystal panel includes lower panel, wherein the plurality of gate driver IC chips are mounted onto the lower panel.

* * * * *